United States Patent

Constable

Patent Number: 5,303,056
Date of Patent: Apr. 12, 1994

[54] DYNAMIC GAIN CORRECTION FOR CRT PRINTING

[75] Inventor: Douglas W. Constable, Rochester, N.Y.

[73] Assignee: Eastman Kodak Company, Rochester, N.Y.

[21] Appl. No.: 944,866

[22] Filed: Sep. 14, 1992

[51] Int. Cl.5 .......................... H04N 5/16; H04N 5/57
[52] U.S. Cl. .................................. 358/350; 358/345; 348/615
[58] Field of Search .............. 358/174, 176, 168, 163, 358/169, 244, 242, 243, 461, 74, 345; 355/20; 396/110 R; H04N 5/16, 5/57, 5/52, 5/14

[56] References Cited

U.S. PATENT DOCUMENTS

| | | | |
|---|---|---|---|
| 2,416,200 | 2/1947 | Nagel | 315/22 |
| 2,448,299 | 3/1948 | Dorne | 315/22 |
| 2,567,861 | 9/1951 | Silliman | 315/22 |
| 3,206,633 | 9/1965 | Jones | 315/22 |
| 3,678,191 | 7/1972 | Peters et al. | 178/7.5 E |
| 3,716,297 | 2/1973 | Wakabayashi | 355/67 |
| 3,919,473 | 11/1975 | Cotter | 358/163 |
| 4,196,446 | 4/1980 | Rowe et al. | 358/74 |
| 4,237,489 | 12/1980 | Kresock | 358/168 |
| 4,300,157 | 11/1981 | Midland | 358/74 |
| 4,415,921 | 11/1983 | Mulvanny et al. | 359/139 |
| 4,599,641 | 7/1986 | Troiano | 358/39 |
| 4,679,087 | 7/1987 | Torrano, Jr. et al. | 358/168 |
| 4,694,356 | 9/1987 | Constable | 358/332 |
| 4,701,788 | 10/1987 | Desjordins | 358/74 |
| 4,729,032 | 3/1988 | Nishiyama et al. | 358/244 |
| 4,731,865 | 3/1988 | Sievenpiper | 382/54 |
| 4,742,397 | 5/1988 | Ferla et al. | 358/244 |
| 4,754,334 | 6/1988 | Kriz et al. | 358/244 |
| 4,843,284 | 6/1989 | Schmitt et al. | 315/371 |
| 4,843,472 | 6/1989 | Shinada | 358/164 |
| 5,003,394 | 3/1991 | Lagoni | 358/168 |
| 5,047,861 | 9/1991 | Houchin et al. | 358/213.15 |
| 5,049,989 | 9/1991 | Tsuji | 358/98 |
| 5,053,879 | 10/1991 | Kubota | 358/244 |
| 5,113,258 | 5/1992 | Roth | 358/167 |
| 5,157,497 | 10/1992 | Topper et al. | 358/163 |

FOREIGN PATENT DOCUMENTS

| | | | |
|---|---|---|---|
| 2745102 | 4/1979 | Fed. Rep. of Germany | 358/163 |
| 53-005525 | 1/1978 | Japan | 358/163 |

Primary Examiner—James J. Groody
Assistant Examiner—Safet Metjahic
Attorney, Agent, or Firm—Ronald Reichman

[57] ABSTRACT

A system is provided that causes the CRT of a CRT printer to produce images on the screen of the CRT, which when projected onto a photographic media will have uniform illumination at all points on the photographic media. The system accomplishes the foregoing by dynamically changing the amplitude (gain) of the video image signal applied to the CRT.

6 Claims, 2 Drawing Sheets

DYNAMIC GAIN CORRECTION FOR CRT PRINTING

FIELD OF THE INVENTION

The present invention relates to a photographic printer in which a CRT is used as a imaging source for producing prints on photosensitive media.

BACKGROUND OF THE INVENTION

A cathode ray tube (CRT) converts information contained in an input signal to electron beam energy and converts that energy into light energy to provide a visual information output on a phosphorous screen. The amount of beam modulation of the CRT and thus, the amount of light output of the CRT is a function of the voltage difference between the cathode and the first grid of the CRT (the grid closest to the cathode). If the voltage of the first grid of the CRT is held constant, then the cathode may be modulated with the voltage that represents the video information i.e. the input signal. In the event the voltage on the cathode is held constant then the voltage on the first grid may be modulated with the voltage that represents the video information i.e. the CRT input signal.

A video amplifier circuit amplifies and processes the video input signal and applies it to either the first grid or cathode of the CRT. A means of scanning the electron beam horizontally and vertically over the screen of the CRT is provided. The combination of scanning and electron beam modulation by the input signal produces an image on the screen of the CRT that will be transferred to the photographic media. The video amplifier provides a means of blanking the video signal during the horizontal and vertical retrace periods i.e. the time it takes for the electron beam to return to its starting point for scanning a horizontal line and the time it takes for the electron beam to return to its starting point for scanning the image vertically.

Photographic printers have been utilized that use a CRT as an imaging source for producing a print on a photosensitive media. A monochromatic or color CRT may be used as a imaging source and a monochromatic or color photosensitive media such as photosensitive paper or film may be used to record the CRT produced image. Typically a monochromatic image is displayed on the phosphorous screen of a CRT by modulating the electron beam of the CRT with dark to light gradations of the image and simultaneously deflecting the CRT electron beam to achieve the position of the pixels on the CRT screen. The image on the screen of the CRT may be transferred to the photographic media by any known means i.e. contact printing (the photographic media is placed directly on the CRT screen), projected by one or more lenses and/or one or more mirrors.

A monochromatic CRT may be used to expose a color picture onto photographic media. When a monochromatic display is used, three sequential exposures through red, green and blue filters will individually expose the photographic media to the red, green and blue components of the image displayed sequentially on the screen of the CRT.

A color CRT may also be used to display a color picture on a photographic media. If a color CRT was used, the color CRT would expose in one sequence the red, green and blue portions of the image on the screen of the CRT simultaneously onto the photographic media.

Assume the CRT is displaying an image from a video input signal. The illumination of the image will decrease from the center to the edges of the screen of the CRT with a gradient. The reason for the foregoing is that the electron beam has to travel an increased distance when it travels to the edge of the CRT screen. Also, the beam is less perpendicular to the phosphor screen when it is near the edges of the screen.

If the image on the screen of the CRT is transferred to the photographic media by one or more lenses, the lens or lenses will project greater illumination at the center of the photographic media than at the edges of the photographic media. The reason for the above is vignetting and cosine fourth falloff. Vignetting reduces illumination of the image for off axis image points and is related to the size and quality of the lens. Cosine fourth falloff pertains to the physics of projecting a round point of light through a lens at a off-axis angle. The projected point of light is an ellipse instead of round and its intensity is reduced compared to a round point of light resulting from an on-axis projection through the lens.

Thus, if a negative photographic media receives an image from the screen of a CRT, the density at the center of the print will be greater than the density near the edges of the print. That is, the center of the print will be darker than the edges of the print for the same video input signal amplitude. Furthermore, if a positive photographic media receives the CRT image, the center of the print will be lighter than the edges of the print for the same video input signal amplitude.

PROBLEMS TO BE SOLVED BY THE INVENTION

One of the problems encountered by the prior art was that for a given CRT input signal the CRT would not have uniform illumination at all points on the screen of the CRT. Thus, the photographic media would not be able to produce prints of uniform density at different locations on the print. The reason for the above, is that the CRT electron beam has to travel different distances. Also, the beam is less perpendicular to the phosphor screen when it is near the edges of the screen.

Another problem encountered by the prior art is that when the image on the screen of the CRT is transferred to a photographic media by one or more lenses, the lens or lenses will project greater illumination at the center of the photographic media than at the edges of the photographic media.

SUMMARY OF THE INVENTION

This invention overcomes the disadvantages of the prior art by compensating for the falloff in illumination towards the edges of the CRT screen when an image on the screen of the CRT is transferred to photographic media by contact printing.

The invention also compensates for the falloff in illumination towards the edges of the image projected onto photographic media by a lens system from the screen of the CRT. In this instance, the invention compensates for illumination falloff in both the CRT and the lens system, so that the image projected onto the photographic media will have uniform illumination at all points.

The system accomplishes the foregoing by dynamically changing the amplitude (gain) of the video input signal.

ADVANTAGEOUS EFFECTS OF THE INVENTION

The above CRT system causes the CRT to produce images on photographic media that have uniform illumination at all points on the photographic media.

This invention compensates for the CRT falloff so that prints having uniform density at all points may be obtained.

The foregoing is accomplished by providing an analog dynamic gain correction system for controlling the illumination of an image that appears on the screen of a CRT of a CRT printing device, from a video source, producing an analog video signal, that represents the image and producing summed horizontal and vertical parabolic signals that are synchronized with the analog video signal, the system comprises: a multiplier coupled to the video source for receiving the video signal, the summed horizontal and vertical parabolic signals, and to the CRT for controlling gain of the video signal and producing an image on the screen of the CRT; whereby, when a photographic media is placed in front of the image appearing on the screen of the CRT, the photographic media will have the same illumination at all points on the photographic media for the same video signal amplitude.

DESCRIPTION OF THE PREFERRED EMBODIMENT

Figure 1:
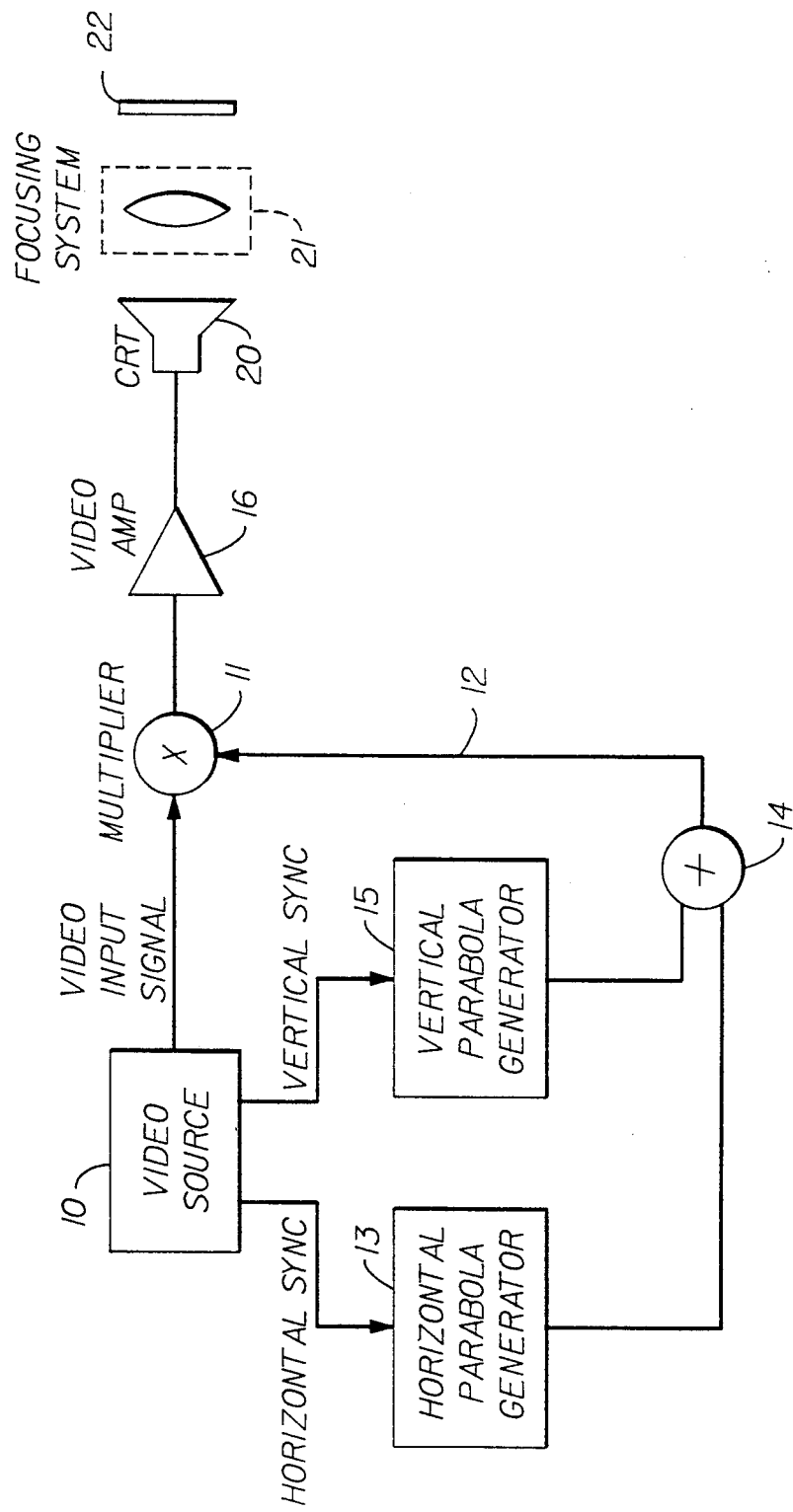
FIG. 1 is a drawing of an analog dynamic gain correction system for a CRT printer.

Referring now to the drawings in detail, and more particularly to FIG. 1, the reference character 10 represents a video source. Video source 10 may be a frame store, a television camera or a scanner or other video source. The video input signal produced by source 10 i.e.. the signal that represents the image that is to be displayed on the screen of CRT 20 is coupled to one of the two inputs of multiplier 11.

When a portion of the video input signal has a certain voltage, for instance 2 volts, a white image will be produced on the screen of CRT 20 and when the video input signal has a voltage of approximately 0 volts a black portion of the image will be produced on the screen of CRT 20. The other input to multiplier 11 is a voltage that will control the system gain. The aforementioned voltage is transmitted on line 12 and is generated as follows. The horizontal sync output of video source 10 is connected to horizontal parabola generator 13. Generator 13 generates a parabolic signal at a horizontal rate, that is transmitted to adder 14. The vertical sync output of video source 10 is connected to vertical parabola generator 15. Generator 15 generates a parabolic signal at a vertical rate that is transmitted to adder 14. Adder 14 adds the above signals and transmits them to multiplier 11 via line 12.

Multiplier 11 multiplies its two input signals and transmits the multiplied signal to video amplifier 16. The aforementioned signal is supplied such that black is at 0 volts or close to 0 volts and white is at a positive voltage for instance 2 volts. The result of having black at 0 volts is that multiplier 11 does not change the output voltage representing black as a function of the parabolic waveform on line 12. The result of having white and shades of grey at non-zero voltages is that the white and grey portions of the signal on line 12 are multiplied by multiplier 11 according to their magnitude.

The output of amplifier 16 drives the cathode or grid of CRT 20 to provide an image on the screen of CRT 20. The parabolic signals on line 12 have their greatest amplitude when the electron beam is near the edges of the screen of CRT 20. Consequently, when the signal on line 12 is multiplied by the video input signal, the signal at the input to amplifier 16 will have increasing amplitude or gain as the electron beam approaches the edges of the screen of CRT 20. Thus, the output of amplifier 16 causes the screen of CRT 20 to have greater illumination at its edges than it would heretofore have had.

A focusing device 21 comprised of one or more lenses and/or one or more mirrors may be placed in front of the screen of CRT 20. Focusing device 21 causes the image appearing on the screen of CRT 20 to be exposed to photographic media 22. The focusing device 21 contributes to the falloff of illumination at the edges of photographic media 22. However, this falloff has been compensated for by the multiplication of the video input signal with the parabolic waveform appearing on line 12. Thus, the screen of CRT 20 will have greater illumination at its edges than it otherwise would have had.

If focusing device 21 is not placed between CRT 20 and photographic media 22, the image appearing on the screen of CRT 20 may be directly exposed onto photographic media 22.

Figure 2:
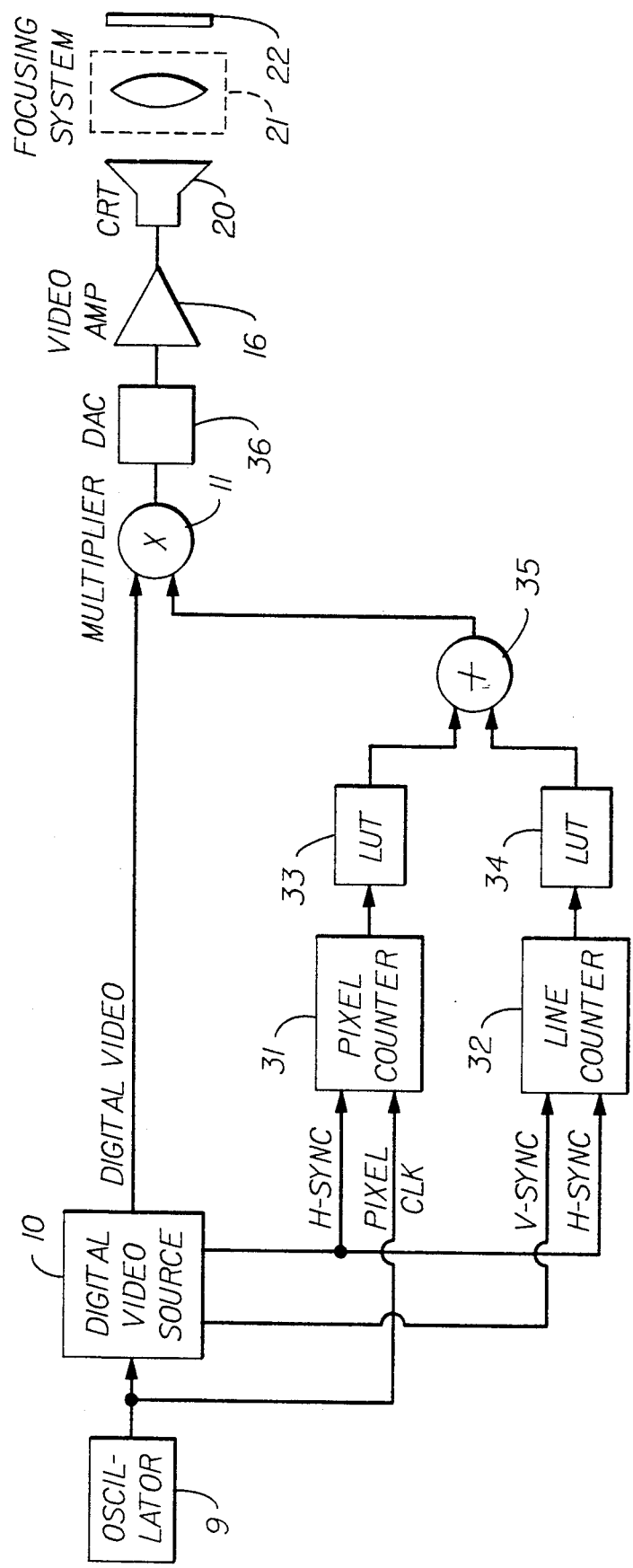
FIG. 2 is a drawing of a digital dynamic gain correction system for a CRT printer.

FIG. 2 is a drawing of a digital dynamic gain correction system for a CRT printer. Oscillator 9 outputs a pixel clock signal that is coupled to the input of digital video source 10 and pixel counter 31.

Digital video source 10 may be a frame store, a television camera or a scanner etc.. The digital video signal produced by source 10 i.e.. the signal that represents the image that is going to be displayed on the screen of CRT 20 is coupled to one of the two inputs of multiplier 11. The horizontal and vertical sync signals are used to synchronize the digital video signal. A certain value of the digital video signal will produce white on the screen of CRT 20 and a zero value of the digital video signal will produce black on the screen of CRT 20. The values of the digital video signal between white and black will produce shades of grey.

The horizontal sync output of source 10 is coupled to the reset input of pixel counter 31. The output of oscillator 9 is coupled to the clock input of pixel counter 31. Pixel counter 31 is used to generate sequential addresses at a rate governed by oscillator 9. The horizontal sync input to the pixel counter 31 resets the address count to a starting point at the beginning of each horizontal line. The digital addresses that are output by counter 31 are transmitted to Look-up-Table 33.

Look-up-Table 33 produces a parabolic signal at a horizontal rate that is transmitted to adder 35.

The vertical sync output of source 10 is coupled to the reset input of line counter 32. The horizontal sync output of digital video source 10 is coupled to the clock input of line counter 32. Line counter 32 is used to generate sequential addresses at a rate governed by the horizontal sync. The vertical sync input to line counter 32 resets the address count to a starting point at the beginning of each vertical sweep. The digital addresses that are output by counter 32 are transmitted to Look-up-Table 34.

Look-up-Table 34 produces a parabolic signal at a vertical rate that is transmitted to adder 35.

Adder 35 adds the above signals and transmits them to one of the inputs of multiplier 11. Multiplier 11 multiplies the digital video signal by the horizontal rate correction parabola added to the vertical rate correction parabola.

The digital output of multiplier 11 is transmitted to digital to analog converter 36. Converter 36 converts its digital input signal to an analog output signal. The above signal is transmitted to amplifier 16.

The output of amplifier 16 drives the cathode or grid of CRT 20 to provide an image on the screen of CRT 20. The parabolic signal at the output of adder 35 has its greatest value when the electron beam is near the edges of the screen of CRT 20. Consequently, when multiplier 11 multiplies the digital video signal by the output of adder 35, the resulting magnitude of the digital video input signal to converter 36 will be increased as the pixel positions approach the horizontal and vertical edges of the raster on the screen of CRT 20. Thus, the output of amplifier 16 causes the screen of CRT 20 to have greater illumination at its edges than it would heretofore have had.

A focusing device 21 comprised of one or more lenses and/or one or more mirrors is placed in front of the screen of CRT 20. Focusing device 21 causes the image appearing on the screen of CRT 20 to be exposed to photographic media 22. The focusing device 21 contributes to the falloff of illumination at the edges of photographic media 22. However, this falloff has been compensated for by the multiplication of the video input signal with the parabolic waveforms appearing on line 12. Thus, the screen of CRT 20 will have greater illumination at its edges than it otherwise would have had.

If focusing device 21 is not placed between CRT 20 and photographic media 22, the image appearing on the screen of CRT 20 may be directly exposed on photographic media 22.

The above specification describes a new and improved dynamic gain correction system for a CRT printer. It is realized that the above description may indicate to those skilled in the art additional ways in which the principles of this invention may be used without departing from the spirit. It is, therefore, intended that this invention be limited only by the scope of the appended claims.

What is claimed is:

1. An analog dynamic gain correction system for modifying the illumination of an image that appears on the screen of a CRT of a CRT printing device from a video source producing an analog video signal that represents the image, characterized by:

producing a correction signal which comprises summed horizontal and vertical parabolic signals that are generated in accordance with stored parabolic relationships;

a multiplier coupled to the video source for receiving the video signal and the summed horizontal and vertical parabolic signals so that the parabolic signals provide an even illumination towards the edges of the CRT, and to the CRT, for controlling gain of the video signal and producing a modified image on the screen of the CRT;

whereby, when a photographic media is placed in front of the image appearing on the screen of the CRT, the photographic media will have a uniform illumination on all points on the photographic media for the same video signal amplitude.

2. The system claimed in claim 1, further including amplification means coupled to the output of said multiplier and the CRT for amplifying the multiplied video signal to produce a signal to drive the CRT.

3. The system claimed in claim 1, further including focusing means coupled to the image on the screen of the CRT and the photographic media for projection of the image on the screen of the CRT onto the photographic media.

4. A digital dynamic gain correction system for compensating the illumination of an image that appears on the screen of a CRT of a CRT printing device, from a digital video source, that produces a digital video signal, that represents the image, and digital horizontal and vertical parabolic signals that are synchronized with the digital video signal, said system comprises:

an oscillator that clocks the output of the digital video source;

a first counter that is coupled to the horizontal sync signal, which resets said counter, and the clock from said oscillator, so that said first counter counts horizontal pixels across the image;

a second counter that is coupled to the vertical sync signal, which resets said second counter, and clocked by the horizontal sync signal from the digital video source, so that said second counter counts vertical pixels down the image;

a first memory coupled to said first counter, said first memory stores a correction value in accordance with a predetermined parabolic relationship for each pixel in the horizontal location across the screen of the CRT;

a second memory coupled to said second counter, said second memory stores a correction value in accordance with a predetermined parabolic relationship for each pixel in the vertical locations down the screen of the CRT;

an adder coupled to said first and second memories, said adder adds the correction for the horizontal pixel to the correction value for the vertical pixel;

a multiplier coupled to the output of said adder and the digital video signal, said multiplier controls the gain of the video signal; and a digital to analog converter for converting the digital output of said multiplier into an analog signal that produces an image on the screen of the CRT;

whereby, when a photographic media is placed in front of the image appearing on the screen of the CRT, the photographic media will have the same illumination at all points of the photographic media for the same digital video signal.

5. The system claimed in claim 4, further including amplification means coupled to said digital to analog converter and the CRT for amplifying the multiplied and analog converted video signal to produce a signal having a higher gain to drive the CRT.

6. The system claimed in claim 4, further including focusing means coupled to the image on the screen of the CRT and the photographic media for projection of the image on the screen of the CRT onto the photographic media.

* * * * *